No. 776,737. PATENTED DEC. 6, 1904.
E. T. GREENFIELD.
ART OF MANUFACTURING SCREW THREADED PIPES, TUBES, OR RODS.
APPLICATION FILED JAN. 23, 1904.
NO MODEL.
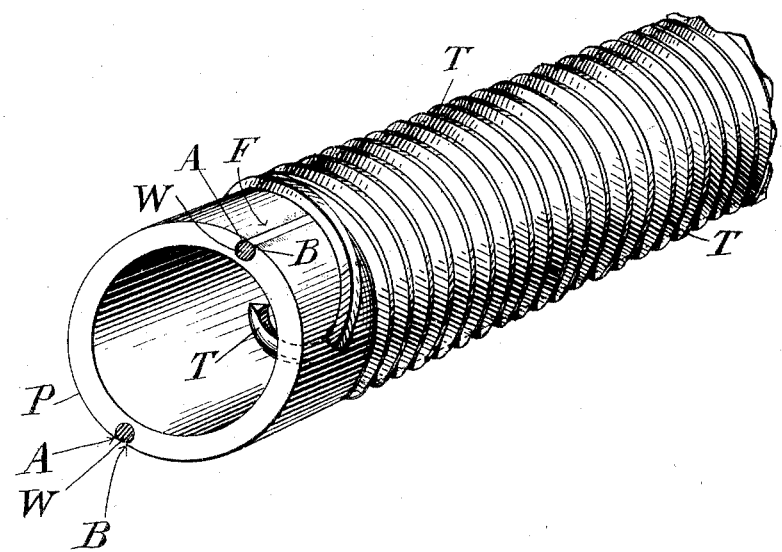
Witnesses
Edward Rowland
M. F. Keating
Inventor
Edwin T. Greenfield
By his Attorney
Charles J. Kintner No. 776,737.

Patented December 6, 1904.

UNITED STATES PATENT OFFICE.

EDWIN T. GREENFIELD, OF MONTICELLO, NEW YORK.

ART OF MANUFACTURING SCREW-THREADED PIPES, TUBES, OR RODS.

SPECIFICATION forming part of Letters Patent No. 776,737, dated December 6, 1904.

Application filed January 23, 1904. Serial No. 190,398. (No model.)

*To all whom it may concern:*

Be it known that I, EDWIN T. GREENFIELD, a citizen of the United States, residing at Monticello, county of Sullivan, and State of New York, have made a new and useful Invention in the Art of Manufacturing Screw-Threaded Pipes, Tubes, or Rods, of which the following is a specification.

In a prior patent granted to me on the 17th day of February, 1903, and numbered 720,579 I have described and claimed a novel method or process of manufacturing screw-threaded pipes, tubes, or rods by winding a thread therearound, inclosing a brazing-wire between said thread and the pipe, tube, or rod to be acted upon, and subsequently heating the entire structure until the threads are securely brazed to the outer surface of the pipe, tube, or rod and to each other; and my present invention is directed to an improvement upon the method or process therein disclosed.

I have ascertained that in the manufacture of screw-threaded pipes, tubes, or rods in accordance with the method or process disclosed in the before-mentioned patent unnecessary expense is incurred, owing to the fact that the tools required for grooving the screw-thread wire are delicate and often break. In the practice of such a method also the expense is materially increased by reason of the use of a larger amount of brazing-wire than is absolutely necessary for effecting the result sought. The wire also often breaks and necessitates a stopping of the machine for the purpose of renewing said wire. My present invention is designed to overcome these objections in that I do away with the necessity of using tools for grooving the screw-thread on its inner face, and I minimize the amount of brazing material necessary. At the same time my improvement makes it possible to manufacture the product at a much higher rate of speed.

My invention will be understood by referring to the accompanying drawing, which is a perspective view of one end of a screw-threaded pipe or tube made in accordance with the method or process hereinafter described and claimed.

Referring to the drawing in detail, P represents a metal pipe or tube, and T a V-shaped screw-thread to be secured thereto in the manner hereinafter described. The pipe, tube, or rod is first passed through a machine having any number of groove-cutting rolls designed to cut longitudinal grooves in its outer surface and to such a depth as will admit of the insertion of the brazing material, preferably brass wire W W. After the wire is inserted the outer edges A B of the groove are flattened down by one or more milling-rolls, so that the brazing-wires will be held securely in position in the grooves. Before the brazing-wires W W are put in position they are passed through a bath of a liquid flux, such as borax, sufficient of the material adhering thereto for the purpose of effecting the brazing process in a manner well understood. The triangular-shaped thread-wire T is then wound spirally upon the outer surface of the pipe, tube, or rod, preferably by a machine, in the manner disclosed in a previous patent granted to me on the 5th day of May, 1903, and bearing number 727,128.

It is obvious that any number of grooves may be cut longitudinally in the outer surface of the pipe, tube, or rod P or that one or more of such grooves might be arranged in longitudinal spirals of great pitch, the essence of my invention lying in the confining or holding of the brazing material in the outer surface of the pipe, tube, or rod prior to the winding of the thread-wire T therearound, whereby the method or process of manufacturing is greatly cheapened and the best results obtained.

Having thus described my invention, what I claim, and desire to secure by Letters Patent of the United States, is—

1. The described method or process of manufacturing a screw-threaded pipe, tube, or rod, consisting in embedding a brazing material and a flux in the outer surface of the same in one or more longitudinal grooves therein; winding a metal thread therearound, then heating the entire mass until the brazing material fuses and finally allowing the same to cool.

2. The described method or process of manufacturing a screw-threaded pipe, tube, or rod, consisting in forming one or more longitudinal grooves in the outer surface of the same; embedding a brazing material and a flux therein; winding a metal thread therearound, then heating the entire mass until the brazing material fuses and finally allowing the same to cool.

In testimony whereof I have signed my name to this specification in the presence of two subscribing witnesses.

EDWIN T. GREENFIELD.

Witnesses:
WM. T. RUETE,
M. F. KEATING.